July 4, 1939.  H. S. CARNEGIE  2,165,127
MOTOR CONTROL SYSTEM
Filed Jan. 13, 1938
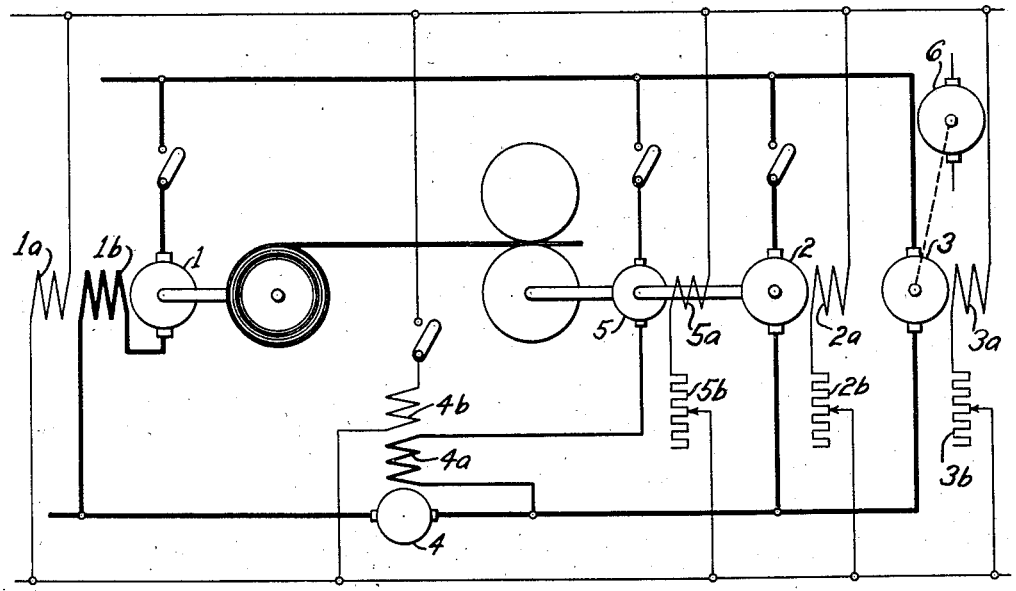
WITNESSES:
Wm. B. Sellers
Nw. C. Groome
INVENTOR
Herbert S. Carnegie.
BY
G. M. Crawford
ATTORNEY Patented July 4, 1939

2,165,127

UNITED STATES PATENT OFFICE 2,165,127

MOTOR CONTROL SYSTEM

Herbert S. Carnegie, Stafford, England, assignor to The English Electric Company Limited, London, England, a British company Application January 13, 1938, Serial No. 184,823 In Great Britain October 29, 1936

5 Claims. (Cl. 172—239)

My invention relates, generally, to motor control systems, and, more particularly to control systems for maintaining predetermined speed relations between motors driving two machines simultaneously acting upon a piece of material, such, for example, as a rolling mill and a reel for winding or unwinding a strip of metal under tension as it is being rolled by the mill.

Where wire, strip or like material going to or coming from some such machine as a rolling mill or calender is being uncoiled from or coiled onto a drum the latter must usually be so driven or retarded that the tension applied to the material is automatically maintained at a constant value which can be determined and adjusted as desired. For this purpose a dynamo electric machine coupled to the drum acts as a driving motor therefor or a braking generator driven thereby. This machine must have its speed varied in proportion, firstly, to any change in the diameter of the coil as the material is being coiled or uncoiled and, secondly, in proportion to any change of speed of the mill or the like. The present invention, as applied to such a machine, is concerned solely with means for varying the speed of the drum in accordance with changes of speed of the mill.

In cases where the mill is driven by an electric motor of which the speed can be varied by means for applying a variable voltage to its armature and, in particular a motor supplied from a motor-generator set on the Ward Leonard system, the motor-generator set or other source of variable voltage has been used to apply voltage to the machine coupled to the coiling drum; thus any change in the excitation of the Ward Leonard generator made for the purpose of varying the speed of the mill by variation of the voltage applied to the armature of the mill driving motor will bring about an equal change in the voltage applied to the armature of the coiler machine, whereby the speeds of the two machines are varied together. Further provision may, however, be made for varying the speed of the mill by varying the excitation of the mill-driving motor. Where it is thus possible to vary the speed of the motor independently of its armature voltage, it is sometimes necessary also to make further provision for influencing the coiler machine speed in accordance with changes in the mill speed due to changes in mill motor excitation.

A similar speed matching problem occurs in other types of mill or other machines where a second dynamo electric machine has to have its speed varied in proportion to any change of the speed of a motor, which will be called for convenience the main motor, and which has its armature supplied by a source of variable and controllable voltage. Thus, for example, in some rolling mills it is desirable for the speed of the roller tables to be varied with that of the mill where the mill motor may, for example, be Ward Leonard controlled. In addition, it may be desirable to adjust the roller table speeds independently so as to have a low speed on the entry side and a speed equal to or higher than that of the mill on the outgoing side; the present invention, however, as applied to this case is concerned solely with means for varying the speed of the table in accordance with changes of speed of the mill.

Broadly, according to the present invention, the armatures of the main motor and of the second dynamo electric machine which may, for example, be the coiler machine or the motor driving the table in the two examples mentioned are both supplied from the same source of variable voltage but, firstly, means are also provided for varying the speed of the main motor independently of its armature voltage by varying its excitation and, secondly further means are supplied acting in response to such variation of motor speed to apply a corresponding additional voltage to the armature of the second dynamo-electric machine. This voltage may be unaltered by any change of speed of the main motor brought about solely by change of applied armature voltage.

In one method of carrying out the invention an exciter in driving connection with the main or mill motor acts on the excitation of a booster, which may be actually a boosting or a bucking machine connected in series circuit relation with the second or coiler machine.

For a more complete understanding of the invention reference should be made to the accompanying drawing wherein the single figure is a diagrammatic view of a control system embodying the principal features of the invention.

Referring to the drawing, the coiler motor armature 1 and mill motor armature 2 are supplied from one common Ward Leonard generator 3 which may be driven in any suitable manner as by means of the motor 6. In series with the armature 1 is a booster generator 4. The latter is excited from the Ward Leonard generator 3 in series with an opposing exciter 5 in driving connection with the mill motor armature 2. The voltage of the control exciter 5 is adjusted to be equal and opposite to the voltage of the Ward Leonard generator 3 when the mill motor 2 has its maximum excitation; thus any change in the voltage of the Ward Leonard generator 3 produces a corresponding change in the mill motor speed and hence in the voltage of the exciter 5 whereby the resultant voltage applied to the field winding 4a of the booster generator 4 is substantially zero.

The mill motor speed may be varied from standstill up to an intermediate value by varying the excitation of the Ward Leonard generator 3 from zero up to a maximum by means of its field winding 3a and rheostat 3b, the mill motor excitation being maintained throughout at its maximum value by means of its field winding 2a. Under these conditions the booster generator 4 is ineffective and the voltage applied to the coiler motor armature 1 is that of the Ward Leonard generator 3. In this way the coiler motor speed is varied in accordance with changes in mill motor speed. If now with the Ward Leonard generator voltage maintained constant the excitation of the mill motor be decreased by the rheostat 2b, the mill motor speed will increase. This, however, will cause the voltage of the exciter 5 to increase above the voltage of generator 3 and apply an excitation to the booster generator 4 proportional to mill speed. The booster generator will accordingly increase the voltage applied to the coiler motor armature 1 proportionally to the increase in mill speed.

The coiler motor 1 and the exciter 5 have field windings 1a and 5a, respectively, which may be fed from the same source as the field windings 2a and 3a, a rheostat 5b being included in series with winding 5a of the exciter 5. The coiler motor also may have a series field winding 1b. The booster generator 4 may have an additional field winding 4b enabling it to be used for "inching" or for maintaining the tension in the material when the mill is at rest.

In the above described arrangement the booster generator voltage is zero for maximum excitation of the mill motor 2, independently of motor speed, but this is not essential to the invention. Thus the booster field winding 4a could be supplied solely by the exciter 5, the booster voltage then varying with any change of mill speed, since the coiler motor armature voltage would still be proportional to mill speed under all conditions. This modification, like the arrangement described, has the disadvantage that the voltage applied to the coiler motor armature 1 at the maximum mill speed is considerably higher than the voltage of generator 3. With a high voltage Ward Leonard set or with an arrangement in which very considerable increase in mill speed is obtained by varying the excitation of the mill motor 2 or, which is worse, if both of these conditions exist, such a scheme as that described might necessitate applying to the armature 1 a much higher voltage than is permissible.

This disadvantage can be overcome by a simple modification in which the apparatus and connections are the same as in the figure but the various windings are differently adjusted. The exciter 5 generates a voltage less than that of the generator 3. It follows that if, for example, the latter voltage be doubled the mill motor speed will be substantially doubled and so will accordingly both the voltage of exciter 5 and the difference between this voltage and the voltage of generator 3; thus an excitation is applied to the booster generator 4 during changes of mill speed brought about solely by changes in the voltage of the generator 3 but this excitation is proportional to the mill speed. The booster generator 4 is arranged to act as a bucking machine opposing the voltage of generator 3 at slow speeds whereby the voltage applied to the coiler motor armature 1 is less than the voltage of generator 3 but is nevertheless proportional thereto and hence proportional to mill motor speed. When, after maximum excitation and voltage of the generator 3 has been attained, the mill motor speed is further varied by the weakening of its excitation, the voltage of the exciter 5 increases, thereby at first weakening the bucking voltage and increasing the voltage applied to the armature 1 of the coiler motor proportionally to mill speed so that it approaches the voltage of generator 3. The arrangement may be such that the bucking voltage is first reduced to zero and then reversed to boost the voltage applied to the coiler motor 1. The various excitations may, however, conveniently be arranged so that at maximum mill speed the voltage of generator 4 is still a bucking voltage or is zero and the coiler motor voltage accordingly never rises above the maximum voltage of the generator 3.

It will be appreciated that in combination with either of the above described forms of the invention means will generally be used for compensating for changes in diameter of the coil and these may either act on the excitation of the coiler motor 1 or superimpose a further voltage on the voltages applied to the armature of the coiler motor. The invention may conveniently be combined with the invention according to the application for Letters Patent, Serial No. 144,634, filed by Herbert Stirling Carnegie and Albert Ernest Rogers on May 25, 1937 and assigned to the same assignee as the present application.

The application of the invention to the speed matching of other dynamo electric machines for other purposes will be readily understood from the typical example described with reference to the accompanying drawing. Thus the machine 2 may be a motor driving a rolling mill and the machine 1 a motor driving the roller table, where it is desired to maintain predetermined speed relations between the two motors.

In view of the foregoing, it will be apparent that I have provided a simple and effective system for controlling the relative speeds of any two motors driving separate work devices which function together in handling or working a strip or piece of material. While the invention has been described as it may be applied for controlling the operation of a motor driving a strip reel in accordance with the operation of a mill motor, it is to be understood that the principles thereof may be utilized to equal advantage in other similar applications where similar problems of speed matching are involved.

While I have illustrated and described a particular embodiment of the invention, it is to be understood that I do not wish to be limited thereto since modifications of the same may be made without departing from the spirit of the invention as defined in the appended claims.

I claim as my invention:

1. A control system comprising a main and auxiliary dynamo electric machines connected to a strip of material, a common source of power for said machines, means for varying the voltage of the power source to vary the speeds of said machines together to maintain a predetermined speed relation therebetween, means for varying the excitation of the main machine to vary its speed independently of the other and without varying the voltage of the power source, a booster generator connected in series with the auxiliary machine and excited from the power source, and means responsive to the speed of the main machine under field excitation control for varying the excitation and thereby the voltage of the booster generator to effect a corresponding variation in the speed of the auxiliary motor to maintain said predetermined speed relation.

2. A control system comprising a main and auxiliary dynamo electric machines connected to a strip of material, a source of power for said machines, means for varying the voltage of the power source to vary the speeds of said machines together, means for varying the excitation of the main machine to vary its speed independently of the other, a booster generator connected in series with the auxiliary machine, and a pilot exciter driven by the main machine and having its armature connected in series with the field winding of the booster generator across the power source for controlling the voltage of the booster generator in accordance with the speed of the main machine.

3. A control system for main and auxiliary dynamo electric machines driving separate work devices disposed to simultaneously act upon a strip of material comprising a source of power connected to both machines, means for varying the voltage of the power source for varying the speed of said machines together to maintain a predetermined speed relation therebetween, means for varying the excitation of the main machine to vary its speed independently of the voltage of the source, and electrical means responsive to the speed of the main machine for varying the voltage impressed on the auxiliary machine independently of the voltage of the source to thereby vary its speed in accordance with the speed of the main machine, said electrical means being ineffective to vary the voltage impressed upon the auxiliary machine when the speeds of said machines are controlled together by varying the voltage of the power source and disposed to become effective in response to the independent speed variation of the main machine under field excitation control.

4. A control system for apparatus having an element operating on a strip of material and a reel for the strip, comprising a main motor for driving the element, a second motor connected to said reel, a main generator for supplying power to said motors in parallel, means for varying the generator voltage to vary the speeds of said motors together, means for varying the excitation of the main motor between maximum and minimum values to control its speed with constant generator voltage, a booster generator connected in series with the second motor to the generator, said booster generator having a field winding connected across the generator, and means responsive to the speed of the main motor for varying the excitation voltage impressed on the field winding of the booster generator thereby to effect a corresponding variation in speed of the second motor.

5. A control system for apparatus having an element operating on a strip of material and a reel for the strip comprising a main motor for driving the element, a second motor connected to said reel, a main generator for supplying power to said motors in parallel, means for varying the generator voltage to vary the speeds of said motors together, means for varying the excitation of the main motor between maximum and minimum values to control its speed with constant generator voltage, a booster generator connected in series with the second motor to the generator, said booster generator having a field winding connected across the generator, an exciter driven by the main motor having its armature connected in series with the field winding of the booster generator and developing a voltage equal to and in opposition to the voltage of the main generator whereby the booster exciter is ineffective when the speeds of the motors are varied together and is effective to increase the voltage of the second motor when the speed of the main motor is varied by field excitation control.

H. S. CARNEGIE.